Oct. 20, 1959 — H. A. BOK — 2,909,114
CONTINUOUS COOKING APPARATUS
Filed Nov. 27, 1956

INVENTOR.
HARALD A. BOK
BY
ATTORNEY

2,909,114
CONTINUOUS COOKING APPARATUS

Harald A. Bok, Aerdenhout, Netherlands

Application November 27, 1956, Serial No. 624,688

Claims priority, application Netherlands December 13, 1955

5 Claims. (Cl. 99—237)

This invention relates to an apparatus for treating material such for example as barley, oats and rye, soya beans, pods etc. The treatment may be a treatment under atmospheric pressure, under a super-atmospheric pressure or under a vacuum. As treating medium gases including inert gases, e.g. nitrogen and also steam may be used, while—if desired—water and flavouring substances and/or other chemicals, if any, may be added. As examples of the treatments may be mentioned the boiling or cooking of cereals to a greater or less extent, the steaming of soya beans, impregnating treatments, e.g. under vacuum and with a liquid.

The object of the invention is to so construct the apparatus that a continuous process under pressure or under vacuum may be carried out therein, the sealing from the atmosphere of the supply and discharge of the material to be treated and the driving of the moving parts within the apparatus admitting of being effected in a simple manner.

To achieve the object according to the invention the apparatus has been made suitable for continuous operation due to the fact that a horizontal or substantially horizontal inner drum is arranged in a pressure-tight casing, of which drum an endwall adapted for the supply of material is mounted on a rotary shaft passing through the corresponding endwall of the casing in pressure-tight relationship with said latter endwall, the other endwall of said drum being provided with a discharge opening for the material, a pressure-tight material feed device and a pressure-tight material discharge device being connected to the corresponding ends of the casing in pressure-tight relationship therewith, said devices communicating with the inner drum, at least one feed line for a treating medium entering the inner drum via the wall of the casing with which it is in pressure-tight relationship.

The rotary inner drum, therefore, is entirely in the atmosphere of steam or gas. The sealing of the rotary shaft of the inner drum passing through en endwall of the outer drum does not present any problems; the feeding and the discharge of the material is effected by devices which are connected to the stationary casing in pressure-tight relationship therewith, which does not constitute any problems either.

If for these devices rotary valves are used, each of said valves may be provided with a scraper at the discharge side, which scraper is driven by the valve rotor, the arrangement being such that each time when a rotor cavity passes the valve outlet, the scraper will clean said cavity. This construction is especially of importance if products are treated which will become somewhat sticky by a steam treatment.

During the feeding of material no steam will be lost if care is taken that the feed hopper of the feed device (rotary valve) connected to the stationary casing in pressure-tight relationship therewith is kept filled; for feeding material from the feeding device to the inner drum the feeding device may discharge into a piece of tubing entering into the casing and in the closed lower end of which the rotary shaft is mounted, said shaft being in the form of a conveyor screw or worm, extending through a feed opening in the adjacent end wall of the inner drum.

Further features of the invention will be elucidated hereinafter in the description of the figures and are laid down in sub claims.

The drawing illustrates an embodiment of an apparatus according to the invention.

Figure 1:
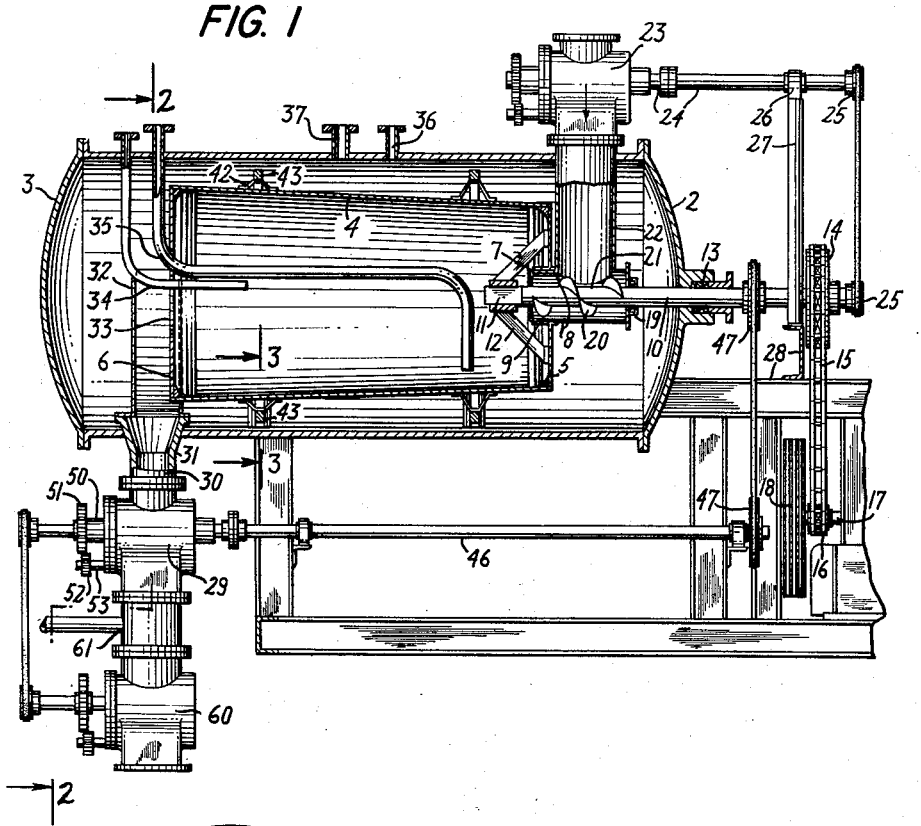
Figure 1 is a vertical longitudinal section through the axis of the inner drum of this apparatus.

In a pressure or steam tight horizontal outer drum having a circumferential wall 1 and endwalls 2 and 3 a slightly conical inner drum having a closed circumferential wall 4 and endwalls 5 and 6 is arranged for rotation about its axis. The endwall 5 is provided with a central opening 7 through which a horizontal piece of tubing 8 extends on which the drum is rotatably mounted by means of a sleeve 9 secured to the endwall 5. A shaft 10 ending in a square 11 within the inner drum centrally passes through the piece of tubing 8, the square 11 being connected with the endwall 5 by arms 12. The shaft 10 passes through the endwall 2 of the outer drum at 13 where a packing gland is provided and outside the outer drum it carries a sprocket wheel 14 which via a chain 15 is coupled with a smaller sprocket wheel 16 on a driving shaft 17 carrying a rope pulley 18. The piece of tubing 8 is closed by a transverse wall 19 provided with means for sealing the shaft passing through said wall. The shaft 10 carries a worm 20 in the piece of tubing 8. To an opening 21 in the wall of the piece of tubing 8 a vertical tube 22 is connected which passes through the circumferential wall 1 of the stationary outer drum in presure-tight relationship therewith and which outside said drum is connected to a rotary valve 23 the rotor of which is provided with three cavities, the shaft 24 of said rotor being coupled with the shaft 10 by means of a transmission 25. The rotor shaft 24 is supported at 26 by a column 27 on the machine frame 28. The valve 23 is a material feed valve.

At the opposite end of the outer casing a material discharge valve 29, likewise comprising a rotor having three cavities, is connected to the lower side of the circumferential wall 1 by means of a piece of tubing 30 which is in pressure-tight relationship with said circumferential wall 1. Within the outer drum said piece of tubing 30 ends as the mouth of a funnel-shaped portion 31 on which mouth semi-circular gutters 32 end, surrounding the inner drum at its discharge end with some play. The endwall 6 of the inner drum is provided with a central discharge opening 33. Supply tubes 34 and 35 enter said drum through the discharge opening 33 in the endwall 6 of the inner drum. The tube 34 is a water supply tube and the tube 35 is a steam supply tube. The latter tube has its outlet located below the lowest point of the discharge opening 33. The tubes 34 and 35 are passed through the circumferential wall of the outer drum and are in steam-tight relationship therewith. To the outer drum steam of the desired pressure may be supplied at 36, which pressure is readable on a manometer provided with a safety valve, which manometer is connectible to said outer drum at 37.

In two interspaced vertical planes the inner drum is supported in the outer drum on rollers 38 mounted for rotation on the circumferential wall 1 of said outer drum e.g. three rollers uniformly distributed over the transverse circumference of said outer drum, each of said rollers being accommodated in a housing 39 and being mounted on a horizontal shaft 40. Each roller 38 partly extends to within the outer drum through an opening 41 in the wall thereof. The rollers are of the type having a circumferential groove between two flanges. At its outer circumference the inner drum is provided in two corresponding places with brackets 42 to which races 43 are secured. Each race bears in the grooves of the associated rollers 38. This construction enables the shafts of said rollers to be lubricated from the outside.

Figure 2:
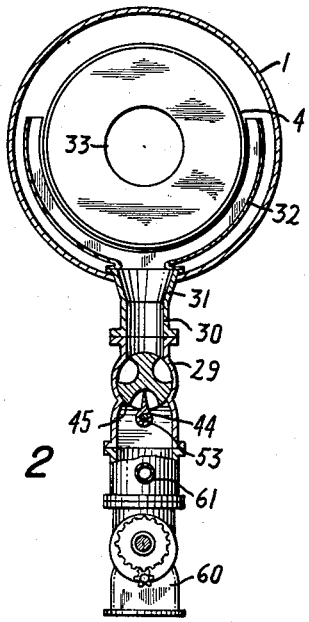
Figure 2 is a cross-sectional view on the line II—II in Figure 1.
Figure 3:
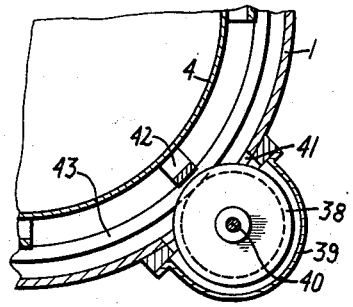
Figure 3 is a sectional view on a larger scale on the line III—III in Figure 1.

In Figure 2 a scraper 44 is shown which is mounted for rotation below the discharge valve 29. The scraper 44 derives its rotation from the rotation of the valve in such a manner that each time when a cavity 34 of the valve rotor passes the outlet port designated by 45 the scraper will clean said cavity. This also applies to the feed valve 23. As will be seen from Figs. 1 and 2, the valve rotor shaft has an extension 50 carrying a gear wheel 51 which meshes with a smaller gear wheel 52 mounted on the shaft 53 of the scraper 44. The scraper action described above in cleaning the cavity of the valve rotor, is readily effected by appropriate selection of the ratio between the gear wheels 51 and 52 and since these gear wheels are mechanically connected and driven from the same shaft, the scraper will rotate synchronously with the valve rotor. By reason of the fact that the gear wheel 51, which is connected to the rotor, is substantially larger than the gear wheel 52, which is connected to the scraper, the scraper will thus rotate at a greater rate than the valve rotor so that during one revolution of the valve rotor the scraper will clean the three cavities of the rotor.

The discharge sluice rotor is coupled with the drive 16, 17, 18 in a similar manner as the feed sluice rotor.

The relative transmission shaft is designated by 46 and the rope pulley by 47.

The sealing of the interior of the outer drum from the atmosphere is ensured by the sealing means at 13 and by the two valves 23 and 29 serving for the feed and the discharge, respectively, of the product. As already stated in the introduction no steam will be lost during the feed because when the hopper feeding the material to the rotor of the feed valve 23 is kept filled, steam cannot escape. At the discharge side some steam may be lost namely the amount determined by the cavities in the rotor of the discharge valve 29. Actual practice has shown that if pressures higher than 2½–3 atmospheres are used, it is advisable to provide a second valve 60 below the discharge valve 29 so that between the two sluices steam that has leaked away may be sucked off, as through the line 61, the valve 60 being suitably driven from the shaft 46.

The stationary outer drum is thermally insulated.

I claim:

1. A continuous cooking apparatus for treating in the presence of steam and under superatmospheric pressure material subject to softening and becoming sticky after exposure to steam which comprises, in combination, a fixed substantially horizontal casing, a longitudinally-extending drum rotatably mounted in said casing, said drum having a central axial opening at one end for receiving the material to be treated and an opposite end opening for discharge of the treated materials, means providing an inlet channel for the material to be treated including a pressure-tight material feed device communicating with said central opening, means defining an outlet channel for the treated material including a pressure-tight material discharge device communicating with said opposite end opening, said last-named opening serving to maintain a predetermined level of said material in said drum during rotation thereof, and steam inlet means extending into said drum and having a discharge end below said level whereby steam is introduced directly and initially into the body of the material in said drum.

2. A continuous cooking apparatus for treating in the presence of steam and under superatmospheric pressure material subject to softening and becoming sticky after exposure to steam which comprises, in combination, a fixed substantially horizontal casing, a longitudinally-extending drum rotatably mounted in said casing, said drum having a central axial opening at one end for receiving the material to be treated and an opposite end opening for discharge of the treated materials, means providing an inlet channel for the material to be treated including a pressure-tight material feed device communicating with said central opening, means defining an outlet channel for the treated material including a pressure-tight material discharge device communicating with said opposite end opening, steam inlet means extending into said drum and having a discharge end adapted to introduce steam into the material in said drum, said material feed device and said material discharge device each comprising a rotor having a plurality of cavities and at least one of said devices including a scraper element positioned to scrape the cavities of the rotor as the rotor rotates.

3. A continuous cooking apparatus for treating in the presence of steam and under superatomspheric pressure material subject to softening and becoming sticky after exposure to steam which comprises, in combination, a fixed substantially horizontal casing, longitudinally-extending drum rotatably mounted in said casing, said drum having a smooth unencumbered interior free from baffles and the like and having a central axial opening at one end for receiving the material to be treated and an opposite end opening for discharge of the treated materials, means providing an inlet channel for the material to be treated including a pressure-tight material feed device communicating with said central opening, means defining an outlet channel for the treated material including a pressure-tight material discharge device communicating with said opposite end opening, said last-named opening serving to maintain a predetermined level of said material in said drum during rotation thereof, and steam inlet means extending into said drum and having a discharge end below said level whereby steam is introduced directly and initially into the body of the material in said drum.

4. A continuous cooking apparatus for treating in the presence of steam and under superatmospheric pressure material subject to softening and becoming sticky after exposure to steam which comprises, in combination, a fixed substantially horizontal casing, a longitudinally-extending drum rotatably mounted in said casing, said drum having a smooth unencumbered interior free from baffles and the like and having a central axial opening at one end for receiving the material to be treated and an opposite end opening for discharge of the treated materials, means providing an inlet channel for the material to be treated including a pressure-tight material feed device communicating with said central opening and an externally-actuated screw conveyor having a shaft extending through the wall of the casing, means defining an outlet channel for the treated material including a pressure-tight material discharge device communicating with said opposite end opening, said last-named opening serving to maintain a predetermined level of said material in said drum during rotation thereof, and steam inlet means extending into said drum and having a discharge end below said level whereby steam is introduced directly and initially into the body of the material in said drum.

5. A continuous cooking apparatus for treating in the presence of steam and under superatmospheric pressure material subject to softening and becoming sticky after exposure to steam which comprises, in combination, a fixed substantially horizontal casing, a longitudinally-extending drum rotatably mounted in said casing, said drum having a smooth unencumbered interior free from baffles and the like and having a central axial opening at one end for receiving the material to be treated and an opposite end opening for discharge of the treated materials, said drum increasing in diameter from said axial opening to said end opening, means providing an inlet channel for the material to be treated including a pressure-tight material feed device communicating with said central opening, means defining an outlet channel for the treated material including a pressure-tight material discharge device communicating with said opposite end opening, said last-named opening serving to maintain a predetermined level of said material in said drum during rotation thereof, and steam inlet means extending into said drum and having a discharge end below said level whereby steam is introduced directly and initially into the body of the material in said drum, said material feed device and said material discharge device each comprising a rotor having a plurality of cavities and at least one of said devices including a scraper element positioned to scrape the cavities of the rotor as the rotor rotates.

References Cited in the file of this patent

UNITED STATES PATENTS

| | | |
|---|---|---|
| 1,079,676 | Wallos | Nov. 25, 1913 |
| 1,728,495 | Lindhard | Sept. 17, 1929 |
| 2,388,298 | Stephens | Nov. 6, 1945 |
| 2,389,330 | Thompson | Nov. 20, 1945 |

FOREIGN PATENTS

| | | |
|---|---|---|
| 879,228 | Germany | June 11, 1953 |